(12) United States Patent
Maloney (10) Patent No.: US 7,555,156 B2
(45) Date of Patent: Jun. 30, 2009

(54) METHOD AND SYSTEM FOR ONLINE COMMUNICATION BETWEEN A CHECK SORTER AND A CHECK PROCESSING SYSTEM

(75) Inventor: Rian R. Maloney, Plano, TX (US)

(73) Assignee: VECTORsgi, Inc., Addison, TX (US)

( * ) Notice: Subject to any disclaimer, the term of this patent is extended or adjusted under 35 U.S.C. 154(b) by 540 days.

(21) Appl. No.: 11/149,776

(22) Filed: Jun. 9, 2005

(65) Prior Publication Data
US 2005/0226487 A1    Oct. 13, 2005

Related U.S. Application Data

(62) Division of application No. 10/616,117, filed on Jul. 9, 2003, now Pat. No. 6,924,450, which is a division of application No. 09/553,228, filed on Apr. 20, 2000, now Pat. No. 6,608,274.

(51) Int. Cl.
G06K 9/00    (2006.01)
(52) U.S. Cl. .................................... 382/139; 382/137
(58) Field of Classification Search ......... 382/135–140, 382/112, 115, 305, 310–311; 194/207, 215, 194/225, 290, 293, 302, 342, 344; 235/462.42, 235/462.38, 487, 492, 494, 379; 705/44–45; 283/58, 67
See application file for complete search history.

(56) References Cited

U.S. PATENT DOCUMENTS 3,277,444 A    10/1966    Masters
4,321,672 A *  3/1982    Braun et al. .................. 705/42
4,520,447 A    5/1985    Nara
4,555,617 A *  11/1985    Brooks et al. ................ 235/379

(Continued)

FOREIGN PATENT DOCUMENTS

EP    0 653 734 A2    11/1994

(Continued)

OTHER PUBLICATIONS

U.S. Appl. No. 09/872,392, entitled "*Method and System for Processing Images for a Check Sorter*," filed Jun. 1, 2001, 30 pages.

(Continued)

*Primary Examiner*—Samir A. Ahmed
*Assistant Examiner*—Mehdi Rashidian
(74) *Attorney, Agent, or Firm*—Fish & Richardson P.C.

(57) ABSTRACT

A system for handling checks is provided that includes a sorter operable to retrieve MICR data from a plurality of checks. An emulator is coupled to the sorter. The emulator is operable to access the MICR data, to generate a process buffer based on the MICR data, and to generate a plurality of feature instructions for each check based on the process buffer. A communication engine is coupled between the emulator and a check processing system. The communication engine is operable to communicate between the emulator and the check processing system in real-time. The check processing system is operable to receive the process buffer from the emulator through the communication engine. The emulator is further operable to communicate the feature instructions to the sorter. The sorter is further operable to process the checks based on the feature instructions.

24 Claims, 4 Drawing Sheets

U.S. PATENT DOCUMENTS

| | | | |
|---|---|---|---|
| 4,649,494 A | | 3/1987 | Rosas |
| 4,888,812 A | | 12/1989 | Dinan |
| 5,025,483 A | | 6/1991 | Dinan et al. |
| 5,159,548 A | | 10/1992 | Caslavka |
| 5,167,021 A | | 11/1992 | Needham |
| 5,208,869 A | | 5/1993 | Holt |
| 5,265,007 A | | 11/1993 | Barnhard, Jr. et al. |
| 5,274,567 A | | 12/1993 | Kallin et al. |
| 5,412,190 A | * | 5/1995 | Josephson et al. ............. 705/45 |
| 5,534,682 A | | 7/1996 | Graef et al. |
| 5,544,043 A | | 8/1996 | Miki et al. |
| 5,554,043 A | | 9/1996 | Miki et al. |
| 5,558,232 A | | 9/1996 | Stevens et al. |
| 5,583,759 A | | 12/1996 | Geer |
| 5,602,936 A | | 2/1997 | Green et al. |
| 5,673,320 A | | 9/1997 | Ray et al. |
| 5,689,579 A | | 11/1997 | Josephson |
| 5,717,868 A | | 2/1998 | James |
| 5,781,654 A | * | 7/1998 | Carney ....................... 382/137 |
| 5,790,260 A | | 8/1998 | Myers |
| 5,825,009 A | | 10/1998 | Schmid |
| 5,825,506 A | | 10/1998 | Bednar et al. |
| 5,870,725 A | | 2/1999 | Bellinger et al. |
| 5,910,988 A | | 6/1999 | Ballard |
| 5,930,778 A | | 7/1999 | Geer |
| 6,009,261 A | | 12/1999 | Scalzi et al. |
| 6,023,705 A | | 2/2000 | Bellinger et al. |
| 6,032,137 A | | 2/2000 | Ballard |
| 6,059,185 A | | 5/2000 | Funk et al. |
| 6,142,682 A | | 11/2000 | Skogby |
| 6,181,837 B1 | * | 1/2001 | Cahill et al. ................ 382/305 |
| 6,349,274 B1 | | 2/2002 | Kay et al. |
| 6,370,266 B1 | | 4/2002 | Lau et al. |
| 6,438,433 B1 | | 8/2002 | Gawne |
| 6,446,072 B1 | | 9/2002 | Schulze et al. |
| 6,574,377 B1 | | 6/2003 | Cahill et al. |
| 6,654,487 B1 | | 11/2003 | Downs, Jr. |
| 6,985,617 B1 | | 1/2006 | Maloney |
| 7,177,456 B2 | | 2/2007 | Maloney |
| 7,178,723 B2 | | 2/2007 | Maloney |
| 2002/0073060 A1 | | 6/2002 | Geisel et al. |
| 2002/0184151 A1 | | 12/2002 | Maloney |
| 2003/0037002 A1 | | 2/2003 | Higgins et al. |
| 2003/0130950 A1 | | 7/2003 | Ahles |
| 2004/0071333 A1 | | 4/2004 | Douglas et al. |
| 2004/0076320 A1 | | 4/2004 | Downs, Jr. |
| 2004/0133516 A1 | | 7/2004 | Buchanan et al. |

FOREIGN PATENT DOCUMENTS

| | | |
|---|---|---|
| EP | 0 841 643 A1 | 10/1997 |
| EP | 0 845 763 A1 | 10/1997 |

OTHER PUBLICATIONS

PCT International Search Report in International Application No. 01/11279, Oct. 26, 2001, 7 pages.

PCT International Search Report in International Application No. 01/12837, Nov. 29, 2001, 8 pages.

Communication pursuant to Article 94(3) EPC (Examination Report) (2 pages); and EPA Form 2906 (Annex to Examination Report) (2 pages); both mailed Feb. 19, 2008 in EPO Application No. 01 924 779.0—1238.

Communication Pursuant to Article 96(2) EPC issued in European Application No. 01928686.3, Mar. 14, 2006, 5 pages.

Examination Report, Australian Patent Application No. 2001255517, Mar. 1, 2006, 3 pages.

Communication pursuant to Article 94(3) EPC (Examination Report) (2 pages); and EPA Form 2906 (Annex to Examination Report) (2 pages); both mailed Feb. 19, 2008 in EPO Application No. 01 924 779.0 - 1238.

* cited by examiner

METHOD AND SYSTEM FOR ONLINE COMMUNICATION BETWEEN A CHECK SORTER AND A CHECK PROCESSING SYSTEM

RELATED APPLICATIONS

This application is a divisional of application Ser. No. 10/616,117, filed Jul. 9, 2003, now U.S. Pat. No. 6,924,450, which is a divisional of application Ser. No. 09/553,228, filed Apr. 20, 2000, now U.S. Pat. No. 6,608,274, which is related to application Ser. No. 09/558,749, filed Apr. 20, 2000, now U.S. Pat. No. 6,985,617.

TECHNICAL FIELD OF THE INVENTION

This invention relates generally to the field of document processing in the financial industry and more particularly to a method and system for online communication between a check sorter and a check processing system.

BACKGROUND OF THE INVENTION

Within the financial industry, document processing is an important part of the daily management of a business. Document processing systems include sorters for physically handling and retrieving data from checks and other items and data processors for analyzing and storing the retrieved data. The sorters and data processors intercommunicate data and instructions to individually read and process each check.

Conventional check sorters for document processing, such as the IBM 3890 and 3890/XP series of check sorters, are relatively large and expensive machines. Thus, purchasing one of these check sorters may place a great financial strain on a small business or may be unreasonable for a larger business needing to process a relatively small number of checks over the business' current capacity. Smaller and less expensive check sorters typically cannot communicate with existing data processing systems that are designed to operate in connection with the IBM 3890 and 3890/XP series of check sorters. As a result, the smaller check sorters are not a viable solution in many applications.

Attempts to solve this problem have included customized emulators which allow a specific check sorter, which may be smaller and less expensive, to emulate the IBM 3890 and 3890/XP series of check sorters so that the data processing system may communicate with the specific check sorter. However, these emulators are hardware-specific solutions. Thus, a different emulator must be designed, programmed and proved out for each different type of check sorter. This customization is time-consuming and expensive and is thus not a practical solution.

Both traditional and customized document processing systems typically use LU 6.2 or channel connect standards to connect to and to communicate with a mainframe running the data processor. These types of connections are expensive to configure and maintain and this limits the viability of these systems.

Yet another disadvantage relates to code line data matching. Typical sorters, and typical emulators as well, provide approximately sixteen lines of memory for code line data matching, which may be used to save time when processing a document for a second time. This limited amount of memory allows data to be saved for a relatively small number of documents. In addition, the processor that searches the memory for code line data matches is generally not fast enough to allow the memory to be expanded. If more lines of data were available to be searched, the processor would not have enough time to search the additional lines of data before the amount of time for processing the document had expired.

SUMMARY OF THE INVENTION

In accordance with the present invention, a method and system for online communication between a check sorter and a check processing system are provided that substantially eliminate or reduce disadvantages and problems associated with previously developed systems and methods. In particular, a communication engine provides real-time communication between a check sorter and a processing system using a TCP/IP connection.

In one embodiment of the present invention, a system for handling checks is provided that includes a sorter operable to retrieve MICR data from a plurality of checks. An emulator is coupled to the sorter. The emulator is operable to access the MICR data, to generate a process buffer based on the MICR data, and to generate a plurality of feature instructions for each check based on the process buffer. A communication engine is coupled between the emulator and a check processing system. The communication engine is operable to communicate between the emulator and the check processing system in real-time. The check processing system is operable to receive the process buffer from the emulator through the communication engine. The emulator is further operable to communicate the feature instructions to the sorter. The sorter is further operable to process the checks based on the feature instructions.

Technical advantages of the present invention include providing an improved check handling system. In particular, the check sorter and the processing system communicate in real-time over a TCP/IP connection. As a result, costs are reduced, greater interaction between components is provided, and links are easier to configure.

Another technical advantage of the present invention includes an improved code line data matching system. The code line data matching is provided in a personal computer or other similar device. As a result, both the memory available for storing data and the processor speed are substantially increased. Accordingly, data may be saved for thousands of documents, while the increased processor speed allows the increased amount of data to be searched in the time available for processing the check.

Still another technical advantage of the present invention includes providing a dynamic check processing system. In particular, search algorithms, including elements of the algorithms, may be dynamically adjusted during a check processing run based on run time parameters. As a result, accuracy and efficiency are improved.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
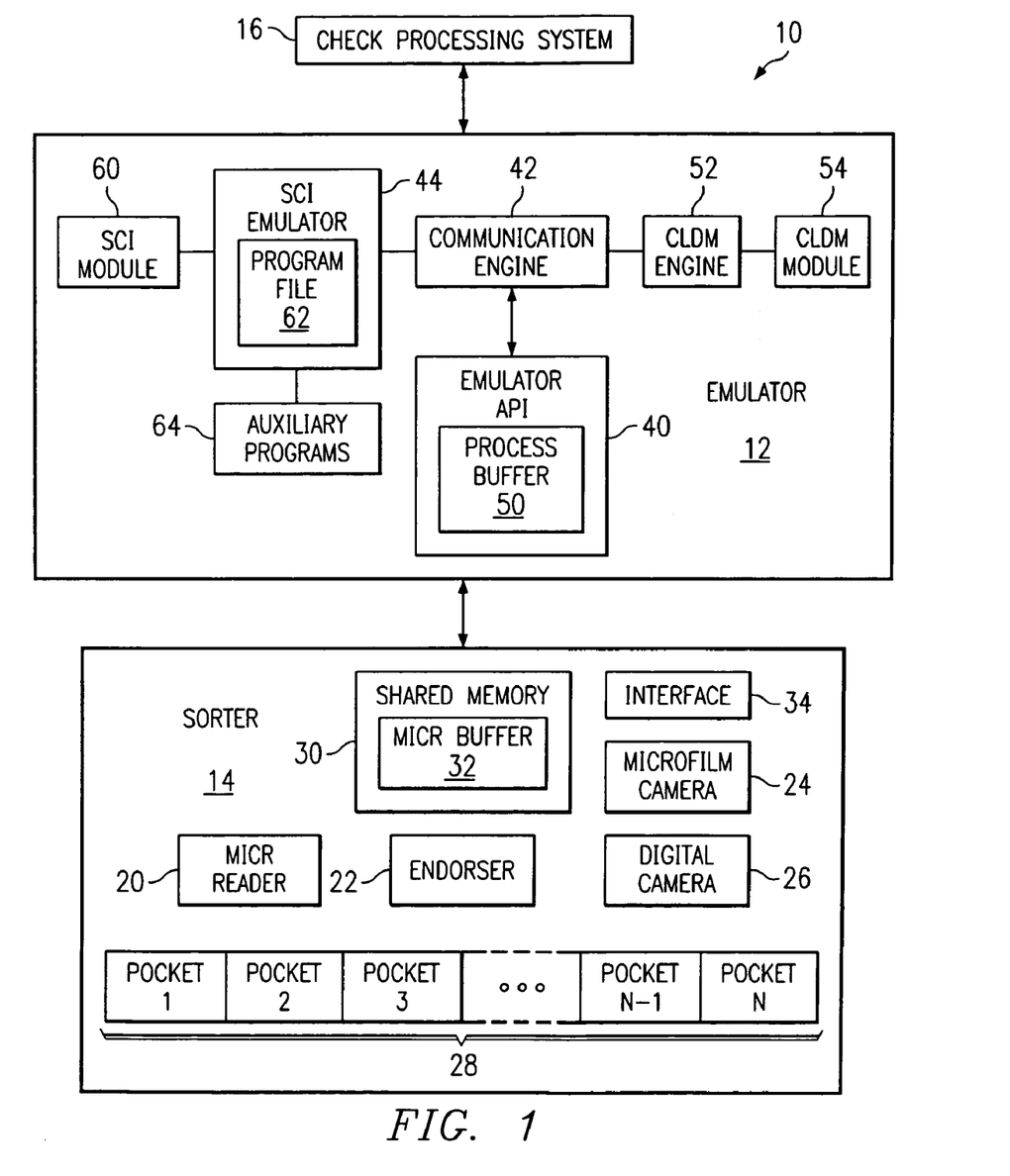
FIG. 1 is a block diagram illustrating a system for handling checks that comprises a check sorter emulator in accordance with one embodiment of the present invention.

FIG. 1 is a block diagram illustrating a system 10 for handling checks in accordance with one embodiment of the present invention. The system 10 comprises a modular emulator 12 for a check sorter, a check sorter 14 for sorting checks for a financial institution or other suitable type of business and a check processing system 16 for making decisions regarding how the sorter 14 is to process the checks and notifying the sorter 14 of the decisions. As described in more detail below, the modular emulator 12 allows the check processing system 16 to communicate with a non-compatible sorter 14 as if the sorter 14 was a compatible sorter. For example, according to one embodiment, the emulator 12 emulates an IBM 3890 series sorter such as and IBM 3890 or 3890/XP sorter. In this embodiment, the check processing system 16 communicates with the emulator 12 as though the emulator 12 were an IBM 3890 or 3890/XP sorter, and the emulator 12 communicates with the sorter 14 through standardized processes.

The sorter 14 may be any one of a plurality of disparate types of suitable sorters. The modular emulator 12 thereby allows a check processing system 16 that is configured to communicate with a specific type of sorter to communicate with other types of sorters 14 that are not directly compatible. For the exemplary embodiment, the sorter 14 may comprise a sorter available from NCR, BancTec, Unisys, or Digital Check, or other sorter capable of reading and exchanging MICR data through standardized processes.

The sorter 14 comprises a MICR reader 20 for retrieving MICR data from the checks, an endorser 22 for endorsing checks, a microfilm camera 24 for recording microfilm images of checks, a digital camera 26 for recording digital images of checks and a plurality of pockets 28 for receiving sorted checks. The endorser 22 may endorse a check by printing endorsement information on the check. The endorsement information may comprise the name of the bank or other financial institution processing the check. The digital camera 26 may record an image of the front and/or the back of each check and may record these images in black and white, gray scale and/or color. Thus, different imaging data may be obtained for different checks. For example, the digital camera 26 may record a black and white image of the front of a first check and a gray scale image of the back of the first check and may record a color image of the front and the back of a second check. It will be understood that the digital camera 26 may comprise one or more devices for recording digital images of checks being processed by the system 10.

The sorter 14 also comprises a shared memory 30 that is shared with the emulator 12 and that comprises a MICR buffer 32. As described in more detail below in connection with FIG. 2, the MICR buffer 32 comprises the MICR data retrieved from the checks by the MICR reader 20. The MICR buffer 32 may be a copy or adaptation of the retrieved data. The MICR data in the MICR buffer 32 is thus in a format that is specific to the particular sorter 14 and need not be customized for the system 10.

The sorter 14 also comprises an interface 34 for interpreting emulator data provided by the emulator 12. This emulator data may comprise feature instructions for the sorter 14 regarding the features of the endorser 22, the microfilm camera, the digital camera 26 and the pockets 28. The interface 34 may be device-specific and maps instructions from the emulator 12 domain to the sorter 14 domain. Thus, based on the emulator data, the interface 34 determines for each check whether or not to endorse the check, record a microfilm image of the check and record a digital image of the check. The interface 34 also determines for each check which digital images and what types of digital images to record, if any, and which pocket 28 is to receive the check.

The emulator 12 comprises an emulator application programming interface (API) 40, a communication engine 42 and a code-executing emulator 44 for executing code provided by the check processing system 16 that is programmed in a language specific to the sorter compatible with the check processing system 16. For the embodiment in which the compatible sorter comprises an IBM 3890 series sorter, the code-executing emulator 44 comprises a stacker control instructions (SCI) emulator 44. The emulator 12 may be compiled for execution on a Windows NT, OS/2, or other suitable platform.

The sorter 14 transmits a message to the API 40 for each check being processed by the sorter 14. The API 40 may then access the shared memory 30 to retrieve the MICR data for the check from the MICR buffer 32. Alternatively, the sorter 14 may pass the MICR buffer 32 to the emulator 12 for processing. The API 40 converts the MICR buffer 32 into a standardized process buffer 50 by reformatting the MICR data into a format that may be processed by the check processing system 16. The process buffer 50 is standardized in that the format of the process buffer 50 is the same regardless of the format of the MICR buffer 32 for the sorter 14. In one embodiment, the standardized process buffer 50 is in the same format as the data provided by a compatible sorter with which the check processing system 16 is designed to operate. In this embodiment, the emulator 12 emulates the compatible sorter for the check processing system 16. Thus, for the embodiment in which the compatible sorter comprises an IBM 3890 series sorter, the API 40 converts the MICR buffer 32 into the standardized process buffer 50 based on IBM standards for the IBM 3890 series of sorters.

After processing is completed by the check processing system 16 for the check, the API 40 updates the MICR buffer 32 in the shared memory 30 with the emulator data, which includes instructions for processing the check. The API 40 then notifies the sorter 14 that the update is complete, allowing the interface 34 to begin interpreting the emulator data in the MICR buffer 32 to complete the processing of the check.

According to one embodiment, the API 40 comprises logic for performing the functions described above. The logic may be encoded in hardware, such as a field-programmable gate array, an application-specific integrated circuit, or the like, and/or software instructions stored in RAM, ROM and/or other suitable computer-readable media for performing the functions associated with the API 40.

The communication engine 42 receives the process buffer 50 from the API 40 for each check being processed by the sorter 14. As used herein, each means every one of at least a subset of the identified items. As the process buffer 50 is passed between components of the system 10, it will be understood that any suitable portion of or the entire process buffer 50 may be passed based on the data in the process buffer 50 required by the receiving component.

After receiving the process buffer 50, the communication engine 42 calls a code line data match (CLDM) engine 52 which attempts to match an identifier for the check in the process buffer 50 to an identifier in a CLDM module 54. The CLDM module 54 may store any suitable identifying information as an identifier and other data such as MICR data, emulator data or any other suitable data relating to the check for each of a plurality of checks previously processed by the check processing system 16. Thus, for example, if a tray of checks being processed by the sorter 14 is dropped or if the sorter 14 jams or if any other situation results in the checks being re-ordered after a portion of the checks have been processed, the CLDM module 54 is able to provide the previously generated emulator data for each of the checks which have already been processed, thereby eliminating the need to fully process those checks a second time.

According to one embodiment, the CLDM module 54 is stored in a personal computer or other suitable device operable to store and process data. The CLDM module 54 may store any suitable number of identifiers and related data for previously processed checks. According to one embodiment, the CLDM module 54 may store up to 20,000 identifiers. The number of identifiers stored in the CLDM module 54 may be changed by the check processing system 16 at any suitable time. Thus, for example, the number may be changed based on the number of checks being processed by the sorter 14 at any particular time. If the number of identifiers to be stored has been embedded into a processing program, the embedded number may be overwritten to allow extended searching capabilities.

If the CLDM engine 52 finds no match in the CLDM module 54, the communication engine 42 calls the SCI emulator 44 which may executed SCI code stored in a SCI module 60. According to one embodiment, the check processing system 16 provides executable SCI code to the emulator 12 for storage in the SCI module 60. The SCI module 60 may also comprise tables of data received from the check processing system 16.

The SCI code in the SCI module 60 comprises a programming language for communicating between a check processing system 16 and an IBM 3890 of 3890/XP. According to one embodiment, the check processing system 16 may provide new SCI code for storage in the SCI module 60 at any suitable time. Thus, for example, new SCI code may be provided by the check processing system 16 for each set of checks processed by the sorter 14.

When the communication engine 42 calls the SCI emulator 44, the SCI emulator 44 accesses the SCI module 60 and begins executing the SCI code stored in the SCI module 60. The SCI emulator 44 may comprise a program file 62 that identifies one or more auxiliary programs 64 in the emulator 12. The auxiliary programs 64 comprise programs in languages other than SCI code which may be easier to maintain. For example, the auxiliary programs 64 may be in C, C++, Cobol, Fortran, or any other suitable programming language. According to one embodiment, these auxiliary programs 64 provide an entry point for special endorsement. The SCI emulator 44 may use the data in the program file 62 to call any one of the auxiliary programs 64 instead of, or in addition to, the SCI code in the SCI module 60. The SCI emulator 44 provides the results from the execution of the SCI code and/or the auxiliary programs 64 to the communication engine 42. According to one embodiment, these results comprise instructions for the endorser 22, the microfilm camera 24 and the digital camera 26.

The communication engine 42 incorporates the results from the SCI emulator 44 into the process buffer 50 received from the API 40 in accordance with a specified format for the check processing system 16. This format may comprise a header, trailer, and/or any other suitable information for providing to the check processing system 16 a return address for the communication engine 42. The formatting is based on the type of communication between the check processing system 16 and the communication engine 42. According to one embodiment, this communication type is TCP/IP. Alternatively, LU 6.2, channel connect, or any other suitable communication type may be used. However, LU 6.2 and channel connect are more expensive and complex types of communication than TCP/IP. The communication engine 42 also provides online connectivity to the check processing system 16 which allows real-time communication between these two components 42 and 16. Real-time communication may include an instruction to disengage the pass for re-orienting or other instructions between the communication engine 42 and the check processing system 16 to dynamically change run time parameters or operations.

According to one embodiment, the communication engine 42 comprises logic for performing the functions described above. The logic may be encoded in hardware, such as a field-programmable gate array, an application-specific integrated circuit, or the like, and/or software instructions stored in RAM, ROM and/or other suitable computer-readable media for performing the functions associated with the communication engine 42.

According to one embodiment, the API 40 and the communication engine 42 communicate with TCP/IP. Thus, although the embodiment shown in FIG. 1 illustrates the API 40 local to the communication engine 42, it will be understood that other suitable embodiments may be implemented without departing from the scope of the present invention. For example, the API 40 may be local to the sorter 14 and remote from the communication engine 42. As used herein, remote means that the two components may be located anywhere in the world with respect to each other and may communicate with each other over a communication link. Alternatively, the API 40 may be local to the communication engine 42 and local to the sorter 14. In accordance with one embodiment, the communication engine 42 may communicate with a plurality of APIs 40 that are remote from the communication engine 42 and each other and that are each local to a sorter 14. Thus, the emulator 12 may be used to emulate a plurality of different types of sorters 14 simultaneously through the use of a plurality of APIs 40.

The check processing system 16 may comprise any suitable combination of one or more of Vector:Sort, Check Processing Control System, SuperMICR, or any other suitable check processing system, and may be implemented on a mainframe. The check processing system 16 receives the process buffer 50 from the communication engine 42 and makes decisions as to the processing of the check based on the process buffer 50. The check processing system 16 also provides data to the CLDM module 54 for the CLDM engine 52 to use for matching.

In operation, a set of checks is provided to the sorter 14 for processing. As each check is passed through the sorter 14, the MICR reader 20 retrieves the MICR data from the check and copies this data to the MICR buffer 32 in the shared memory 30. The sorter 14 then notifies the API 40 that the MICR buffer 32 is available for processing. The API 40 accesses the MICR buffer 32 and converts the MICR data into a process buffer 50. The process buffer 50 is then provided to the communication engine 42. The communication engine 42 calls the CLDM engine 52 which attempts to match an identifier in the process buffer 50 to an identifier in the CLDM module 54. If a match is found, the CLDM engine 52 retrieves previously generated emulator data for the check and provides this information to the communication engine 42. However, if no match is found, the communication engine 42 calls the SCI emulator 44. The SCI emulator 44 then begins executing the SCI code in the SCI module 60 and/or an auxiliary program 64 and provides the results to the communication engine 42.

The communication engine 42 includes these results in the process buffer 50 before providing the process buffer 50 to the check processing system 16. The check processing system 16 makes decisions regarding how to process the check based on the data in the process buffer 50.

The API 40 generates emulator data based on the updated process buffer 50 from the check processing system 16 and copies the emulator data into the MICR buffer 32 of the shared memory 30 for the sorter 14. The API 40 then notifies the sorter 14 that the emulator data is available for the check. The interface 34 interprets the updated MICR buffer 32 that includes the emulator data in order to determine how to process the check. The emulator data instructs the interface 34 whether or not to endorse the check, to record a microfilm image of the check and to record a digital image of the check. The interface 34 then signals the endorser 22, the microfilm camera 24 and/or the digital camera 26 in accordance with the feature instructions. According to one embodiment, the interface 34 provides a signal to each of the features 22, 24 and/or 26 which are to be activated and provides no signal to the features 22, 24 and/or 26 which are not to be activated.

For the digital camera 26, the interface 34 also notifies the digital camera 26 which images to record (front and/or back), what type of image (black and white, gray scale or color) to record for the front and what type of image to record for the back. The interface 34 also identifies a pocket 28 to the sorter 14 for the check. After any requested endorsement is performed and images are recorded, the sorter 14 directs the check to the pocket 28 identified by the interface 34.

Figure 2:
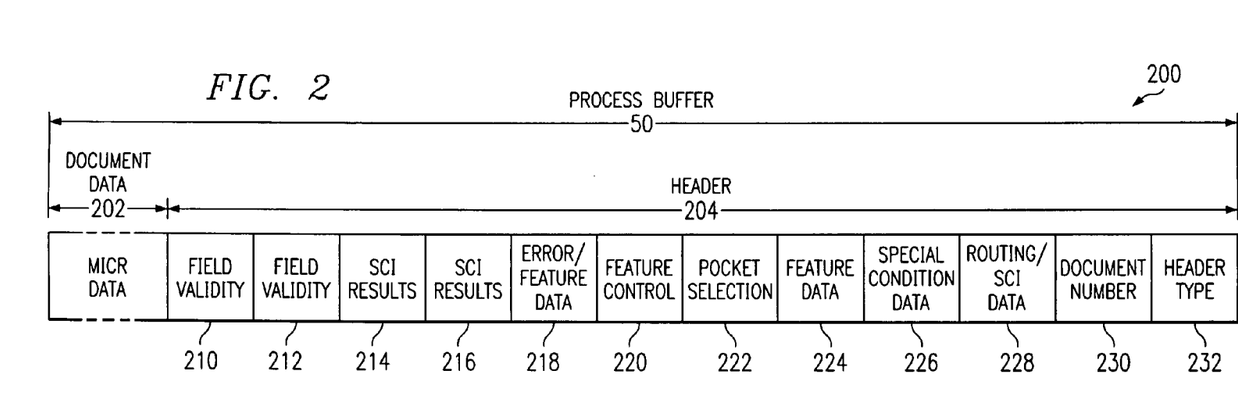
FIG. 2 is a block diagram illustrating a frame structure for the process buffer of FIG. 1 in accordance with one embodiment of the present invention.

FIG. 2 is a block diagram illustrating a frame structure 200 for the process buffer 50 in accordance with one embodiment of the present invention. The frame structure 200 for the processor buffer 50 comprises document data 202 and a header 204. According to one embodiment, the document data 202 comprises MICR data retrieved from a check, and the header 204 comprises 12 bytes of header data 210, 212, 214, 216, 218, 220, 222, 224, 226, 228, 230 and 232. When the CLDM engine 52 detects a match in the CLDM module 54 for the check being processed, the header 204 is replaced with data stored in the CLDM module 54.

In accordance with one embodiment, the header 204 comprises two field validity bytes 210 and 212. The first field validity byte 210 comprises a bit to indicate an end-of-file for code line data matching and seven bits to indicate a digit error in one of seven corresponding fields. The second field validity byte 212 comprises one bit to indicate that either the opening symbol for the first field was missing from the check or the leading edge of the check was damaged. The second field validity byte 212 also comprise seven bits to indicate an invalid length or a special symbol sequence error in one of seven corresponding fields. An invalid length or special symbol sequence error indicates that the opening or closing symbol for a field was either missing or incorrect or that the number of digits detected in the field was incorrect.

The header 204 also comprises two SCI results bytes 214 and 216. These bytes 214 and 216 both comprise data generated by the SCI emulator 44 through the execution of SCI code in the SCI module 60 and/or an auxiliary program 64.

The error/feature data byte 218 comprises a bit to indicate the validity of endorsement data, a bit to indicate the validity of INF data, a bit to indicate a power encoder error, a bit to indicate a time-out error, a bit to indicate an image request, a bit to indicate that an OCR3 feature was initialized "on" and two bits for communicating any suitable data.

The feature control byte 220 comprises a bit to indicate that a predetermined number of checks have been recorded by the microfilm camera 24, causing a pause to occur while the microfilm is spaced. The feature control byte 220 also comprises a bit to enable a flash for lighting the check as the microfilm camera 24 records a microfilm image of the check. The feature control byte 220 also comprises a bit that may cause a one to be added to the value of a high order segment of an index number, while the low order segment is reset to zero. The feature control byte 220 also comprises a bit that may cause a one to be added to the low order segment of the index number. The feature control byte 220 also comprises a bit to inhibit the printing of endorsement data by the endorser 22 and a bit to inhibit the printing of INF data. Similar to the bits relating to the index number, the feature control byte 220 comprises a bit to increment the INF high order segment, while resetting the INF low order segment to zero, and a bit to increment the INF low order segment.

The pocket selection byte 222 comprises three bits for module selection, three bits for pocket selection and two bits for communicating any suitable data. The feature data byte 224 comprises a bit to indicate that the endorsement feature was initialized "on," a bit that forces the check to be directed to the first pocket of the first module, a bit to indicate that power encoding was not done or was invalid, a bit to indicate that no code line data matching was attempted by the CLDM engine 52, a bit to indicate that the process buffer 50 was modified by specified macros or functions, a bit to indicate that the microfilm camera was initialized "on," a bit to indicate that the INF feature was initialized "on" and a bit to identify a first document processed after a microfilm space.

The special condition data byte 226 comprises a bit to indicate a hardware-detected autoselect. A hardwaredetected autoselect indicates that at least one of the following conditions occurred: multiple checks, a distance between checks less than a predetermined amount, a check length greater than a predetermined amount, a check length less than a predetermined amount, a distance between the leading edges of consecutive checks less than a predetermined amount and a special symbol sequence error. The special condition data byte 226 also comprises a bit to indicate an invalid module-pocket code autoselect, a bit to indicate a late module-pocket code autoselect, a bit to indicate a SCI error, a bit to indicate a merged document, a bit to indicate that the CLDM engine 52 found no match in the CLDM module 54, a bit to indicate that a high order zero correction occurred and a bit to indicate that a symbol error correction occurred.

The routing/SCI data byte 228 comprises four bits for a routing number self-check digit, one bit to indicate an invalid routing number self-check digit, a bit to indicate a SCI pause and two bits for communicating any suitable data. The document number byte 230 comprises a document sequence number for the check. According to one embodiment, this number ranges from X00 to XFF.

The header type byte 232 identifies the type of header 204 for the process buffer 50. According to one embodiment, the header type may comprise a document data header, an exception header, a SCI error header, a data management header or any other suitable header type.

Figure 3:
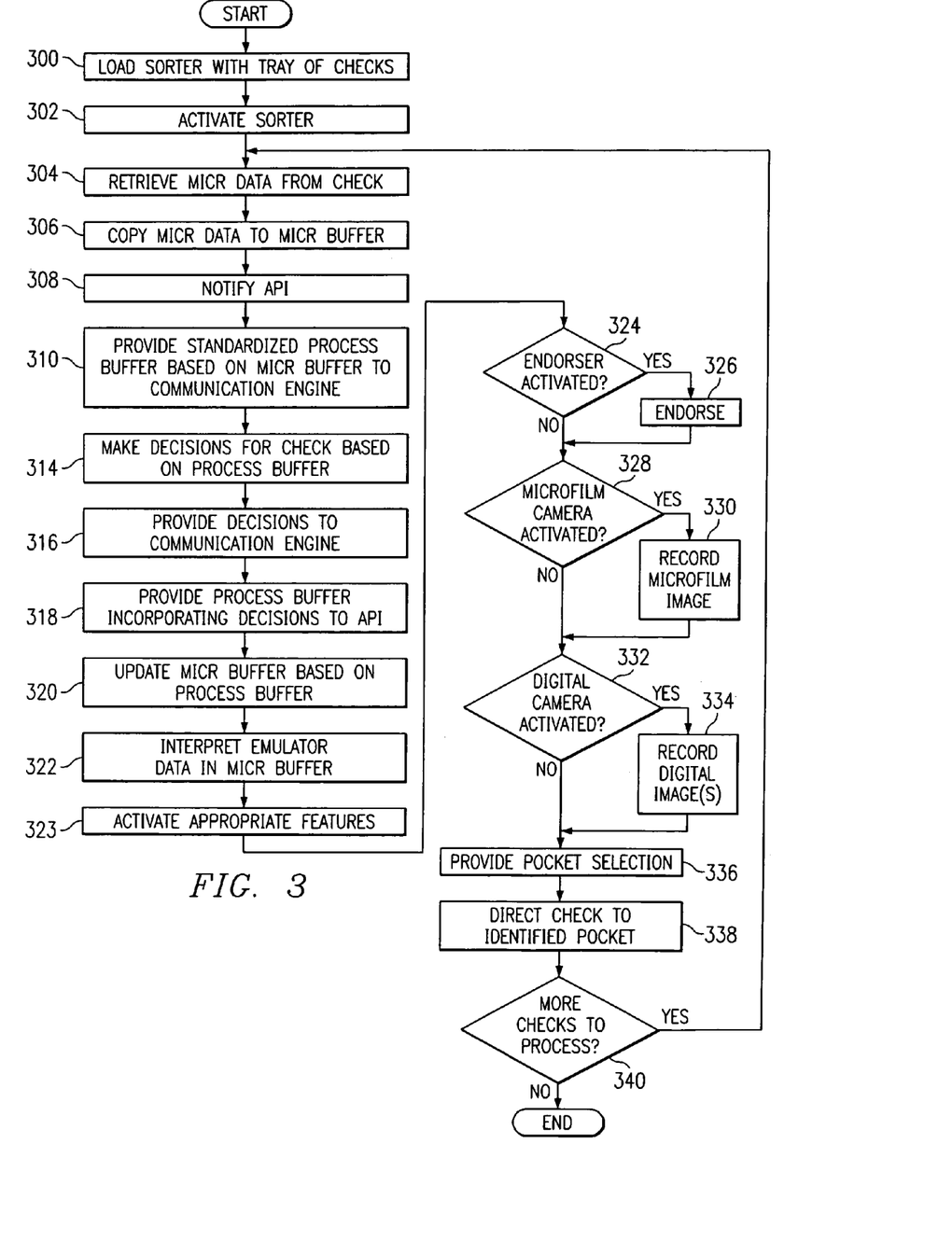
FIG. 3 is a flow diagram illustrating a method for processing checks using the system of FIG. 1 in accordance with one embodiment of the present invention.

FIG. 3 is a flow diagram illustrating a method for processing checks using the system 10 in accordance with one embodiment of the present invention. The method begins at step 300 where the sorter 14 is loaded with a tray of checks. At step 302, the sorter 14 is activated. At step 304, the MICR reader 20 retrieves MICR data from a check. At step 306, the MICR data retrieved by the MICR reader 20 is copied to the MICR buffer 32 in the shared memory 30. The sorter 14 then notifies the API 40 that the MICR buffer 32 contains data for a check in step 308.

At step 310, the API 40 generates and provides a standardized process buffer 50, which is based on the MICR buffer 32, to the communication engine 42. The standardized process buffer is in a format that is compatible with the check sorter that is being emulated by the emulator 12. In one embodiment, data is mapped from a hardware-specific domain to a standard-domain. At step 314, decisions are made for the check based on the process buffer 50. At step 316, these decisions are provided to the communication engine 42.

At step 318, the communication engine 42 provides the process buffer 50 incorporating the decisions to the API 40. At 320, the API 40 updates the MICR buffer 32 with emulator data based on the process buffer 50 received back from the communication engine 42. In one embodiment, the emulator data is copied to predefined fields in the MICR buffer 32.

At step 322, the interface 34 interprets the emulator data in the MICR buffer 32. At step 323, the interface 34 activates the appropriate features 22, 24 and/or 26 in accordance with the emulator data. At decisional step 324, a determination is made regarding whether or not the endorser 22 has been activated. If the endorser 22 has been activated, the methods follows the Yes branch from decisional step 324 to step 326 where the endorser 22 endorses the check. However, if the endorser has not been activated, the method follows the No branch from decisional step 324 to decisional step 328.

At decisional step 328, a determination is made regarding whether or not the microfilm camera 24 has been activated. If the microfilm camera 24 has been activated, the method follows the Yes branch from decisional step 328 to step 330 where the microfilm camera 24 records a microfilm image of the check. However, if the microfilm camera 24 has not been activated, the method follows the No branch from decisional step 328 to decisional step 332.

At decisional step 332, a determination is made regarding whether or not the digital camera 26 has been activated. If the digital camera 26 has been activated, the method follows the Yes branch from decisional step 332 to step 334 where the digital camera 26 records one or more digital images of the check. As described in more detail above, the digital camera 26 may record an image of the front and/or an image of the back of the check. In addition, each image recorded by the digital camera 26 may be either black and white, gray scale or color. Thus, one or more of a number of indicators may be set for the digital camera 26. Returning to decisional step 332, if the digital camera 26 has not been activated, the method follows the No branch from decisional step 332 to step 336.

At step 336, the interface 34 provides a pocket selection for the check. At step 338, the sorter 14 directs the check to the identified pocket 28. At decisional step 340, the sorter 14 makes a determination regarding whether there are more checks to process. If there are more checks to process, the method follows the Yes branch from decisional step 340 and returns to step 304 where the MICR reader 20 retrieves MICR data from a subsequent check. However, if there are no more checks to process, the method follows No branch from decisional step 340 at which point the method comes to an end. Thus, each check passing through the sorter 14 is individually processed by the check processing system 16 through the use of the emulator 12 that allows the check processing system 16 to communicate with the sorter 14 as though the sorter 14 were a different type of sorter.

Figure 4:
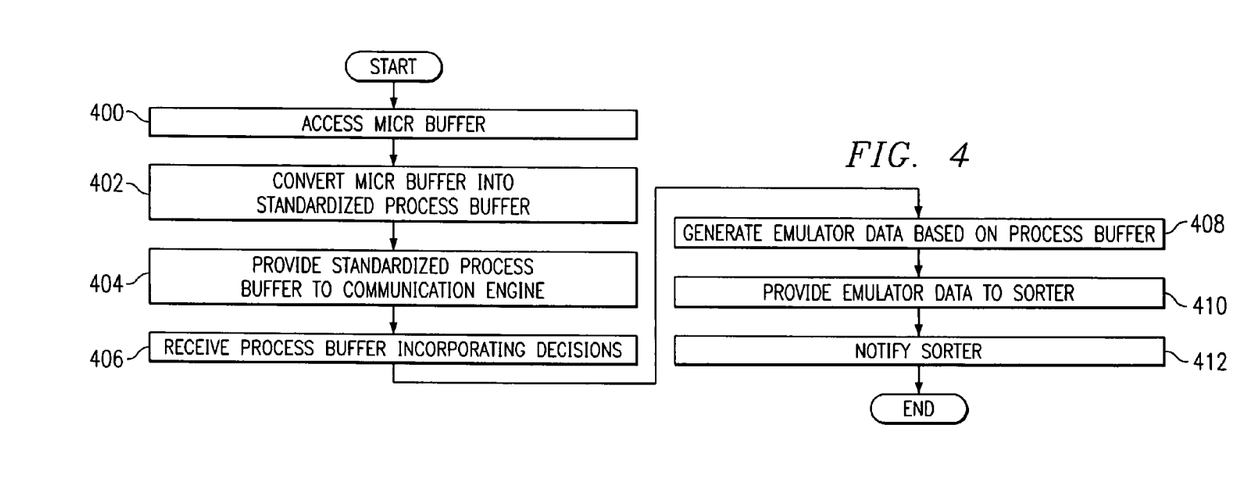
FIG. 4 is a flow diagram illustrating a method for communicating between the communication engine and the sorter of FIG. 1 in accordance with one embodiment of the present invention.

FIG. 4 is a flow diagram illustrating a method for communicating between the communication engine 42 and the sorter 14 in accordance with one embodiment of the present invention. The method begins at step 400 where the API 40 accesses the MICR buffer in the memory 30 that is shared with the sorter 14. At step 402, the API 40 converts the MICR buffer 32 into a standardized process buffer 50. At step 404, the API 40 provides the standardized process buffer 50 to the communication engine 42.

At step 406, the API 40 receives the process buffer 50 incorporating decisions made by the check processing system 16 back from the communication engine 42. At step 408, the API 40 generates emulator data based on the process buffer 50. At step 410, the API 40 provides the emulator data to the sorter 14 by updating the MICR buffer 32 in the shared memory 30 with the emulator data. At step 412, the API 40 notifies the sorter 14 that the MICR buffer 32 has been updated, at which point the method comes to an end.

Figure 5:
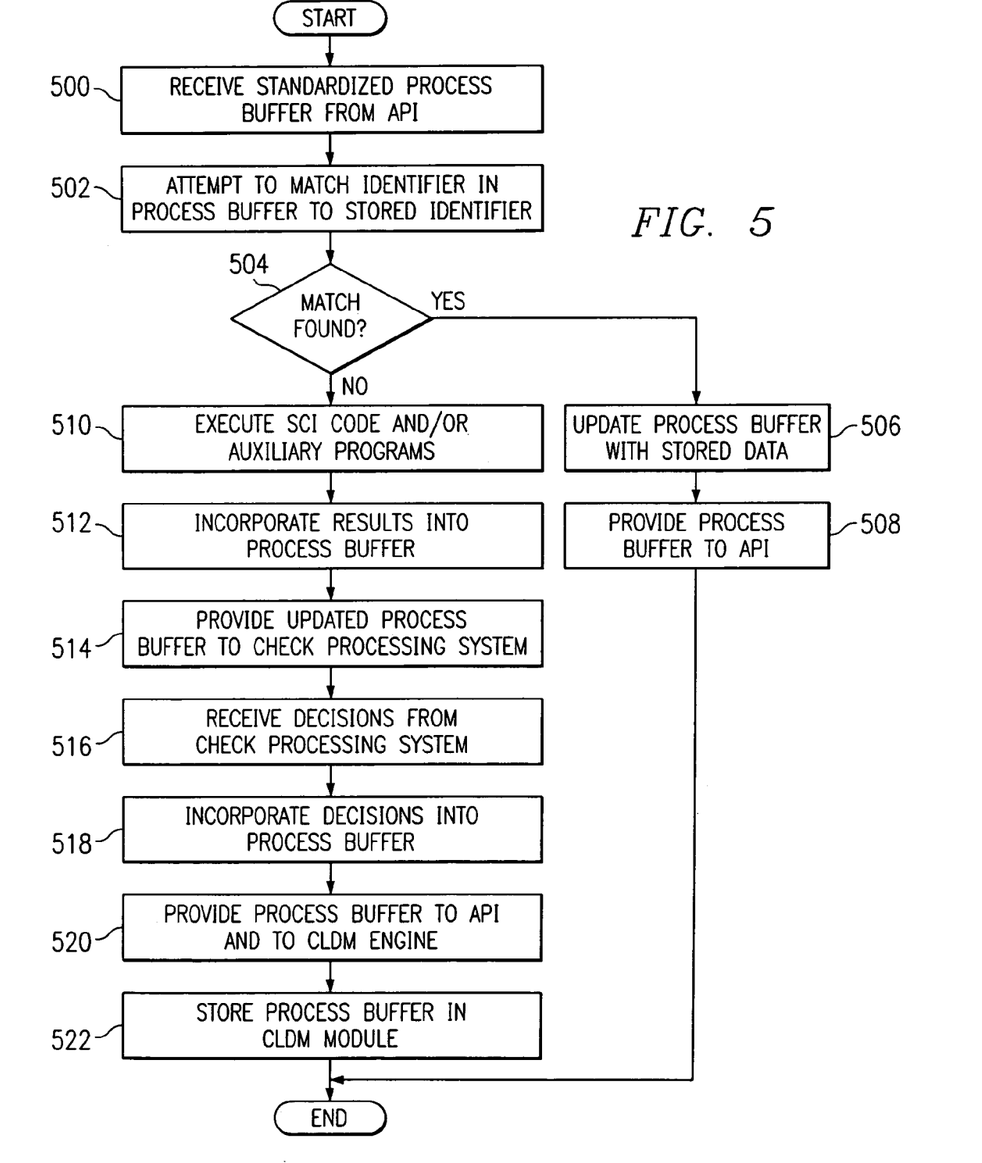
FIG. 5 is a flow diagram illustrating a method for communicating between the check processing system and the emulator API of FIG. 1 in accordance with one embodiment of the present invention.

FIG. 5 is a flow diagram illustrating a method for communicating between the check processing system 16 and the emulator API 40 in accordance with one embodiment of the present invention. The method begins at step 500 where the communication engine receives the standardized process buffer 50 from the API 40. At step 502, the communication engine 42 calls the CLDM engine 52 which attempts to match an identifier in the process buffer 50 to an identifier stored in the CLDM module 54. At decisional step 504, a determination is made regarding whether or not a matching identifier was found in the CLDM module 54.

If a matching identifier was found, the method follows the Yes branch from decisional step 504 to step 506 where the process buffer 50 is updated with data stored in the CLDM module 54. At step 508, the communication engine 42 provides the updated process buffer 50 to the API 40, at which point the method comes to an end.

Returning to decisional step 504, if no matching identifier was found, the method follows the No branch from decisional step 504 to step 510. At step 510, the communication engine 42 calls the SCI emulator 44 which may execute SCI code stored in the SCI module 60 and/or one or more auxiliary programs 64 identified in the program file 62. At step 512, the communication engine 42 incorporates results received from the SCI emulator 44 into the process buffer 50. At step 514, the communication engine 42 provides the updated process buffer 50 to the check processing system 16.

At step 516, the communication engine 42 receives decisions regarding the check from the check processing system 16. At step 518, the communication engine 42 incorporates the decisions received from the check processing system 16 into the process buffer 50. At step 520, the communication engine 42 provides the process buffer 50 to the API 40 and to the CLDM engine 52. At step 522, the CLDM engine 52 stores the process buffer 50 in the CLDM module 54 for future matching, at which point the method comes to an end.

Although the present invention has been described with several embodiments, various changes and modifications may be suggested to one skilled in the art. It is intended that the present invention encompasses such changes and modifications as fall within the scope of the appended claims.

What is claimed is:

1. A computer-readable medium encoded with a computer program and operable when executed to:
   receive MICR data for a check;
   perform a search of code line data for a match based on the received MICR data using a predefined algorithm, the code line data comprising more than sixteen identifiers and each identifier identifying a previously-processed check; and if a match is found:

identify the check as a particular one of the previously-processed checks using the matching identifier;

retrieve previously-generated emulator data associated with the particular previously-processed check; and update a process buffer with the retrieved emulator data for use with a check processing system.

2. The computer-readable medium of claim 1, further operable to modify the predefined algorithm based on the MICR data.

3. The computer-readable medium of claim 1, the MICR data comprising an account number for the check.

4. The computer-readable medium of claim 1, the code line data comprising at least 1,000 identifiers.

5. The computer-readable medium of claim 1, one of the identifiers comprising an account number for the particular previously-processed check.

6. The computer-readable medium of claim 1, the predefined algorithm comprising one of a plurality of invokable predefined algorithms, each predefined algorithm comprising an entry point for special endorsement.

7. The computer-readable medium of claim 1, the predefined algorithm operable to generate instructions for at least one of an endorser, a microfilm camera, and a digital camera.

8. A method for code line data matching, comprising:

using a processor to perform the steps of:

receiving MICR data for a check;

performing a search of code line data for a match based on the received MICR data using a predefined algorithm, the code line data comprising more than sixteen identifiers and each identifier identifying a previously-processed check; and if a match is found:

identifying the check as a particular one of the previously-processed checks using the matching identifier;

retrieving previously-generated emulator data associated with the particular previously-processed check; and updating a process buffer with the retrieved emulator data for use with a check processing system.

9. The method of claim 8, further comprising modifying the predefined algorithm based on the MICR data.

10. The method of claim 8, the code line data comprising a first specified number of identifiers, the method further comprising modifying the predefined algorithm such that the code line data comprises a second specified number of identifiers.

11. The method of claim 8, the code line data comprising at least 1,000 identifiers.

12. The method of claim 8, one of the identifiers comprising an account number for the particular previously-processed check.

13. The method of claim 8, the predefined algorithm comprising one of a plurality of invokable predefined algorithms, each predefined algorithm comprising an entry point for special endorsement.

14. The method of claim 8, the predefined algorithm generating instructions for at least one of an endorser, a microfilm camera, and a digital camera.

15. A system for code line data matching, comprising:

memory storing code line data; and one or more processors operable to:

receive MICR data for a check;

perform a search of the code line data for a match based on the MICR data using a predefined algorithm, the code line data comprising more than sixteen identifiers and each identifier identifying a previously-processed check; and if a match is found:

identify the check as a particular one of the previously-processed checks using the matching identifier;

retrieve previously-generated emulator data associated with the particular previously-processed check; and update a process buffer with the retrieved emulator data for use with a check processing system.

16. The system of claim 15, the one or more processors further operable to modify the predefined algorithm based on the MICR data.

17. The system of claim 15, the code line data comprising a first specified number of identifiers and the one or more processors farther operable to modify the predefined algorithm such that the code line data comprises a second specified number of identifiers.

18. The system of claim 15, the code line data comprising at least 1,000 identifiers.

19. The system of claim 15, one of the identifiers comprising an account number for the particular previously-processed check.

20. The system of claim 15, the predefined algorithm comprising one of a plurality of invokable predefined algorithms, each predefined algorithm comprising an entry point for special endorsement.

21. The system of claim 15, the predefined algorithm generating instructions for at least one of an endorser, a microfilm camera, and a digital camera.

22. The computer-readable medium of claim 1, further operable if a match is not found to:

generate code line data for the check, the code line data comprising an identifier identifying the check; and store the code line data in the process buffer.

23. The method of claim 8, if a match is not found, further comprising:

generating code line data for the check, the code line data comprising an identifier identifying the check; and storing the code line data in the process buffer.

24. The system of claim 15, if a match is not found, the one or more processors further operable to:

generate code line data for the check, the code line data comprising an identifier identifying the check; and store the code line data in the process buffer.

* * * * *

UNITED STATES PATENT AND TRADEMARK OFFICE
CERTIFICATE OF CORRECTION

PATENT NO. : 7,555,156 B2 Page 1 of 1
APPLICATION NO. : 11/149776
DATED : June 30, 2009
INVENTOR(S) : Rian R. Maloney

It is certified that error appears in the above-identified patent and that said Letters Patent is hereby corrected as shown below:

Cover Page, item [56] References Cited, Other Publications – after "U.S." insert -- Patent --

In column 12, claim 17, line 27 – replace "farther" with -- further --

Signed and Sealed this

Twenty-fifth Day of August, 2009

David J. Kappos
*Director of the United States Patent and Trademark Office*